Figure 2A:
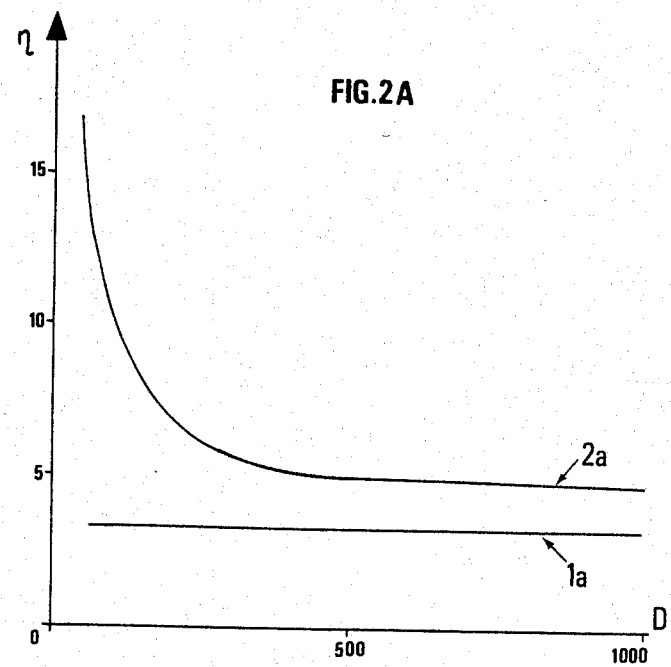

United States Patent [19]

Candau et al.

[11] Patent Number: 4,521,317

[45] Date of Patent: Jun. 4, 1985

[54] PROCESS FOR MANUFACTURING A MICROLATEX IN A CONTINUOUS OIL PHASE BY POLYMERIZATION OF A WATER-SOLUBLE MONOMER IN A WATER-IN-OIL MICROEMULSION, RESULTANT MICROLATICES, AND THEIR USE FOR ENHANCED OIL RECOVERY

[75] Inventors: Francoise Candau; Yee-Sing Leong, both of Strasbourg; Norbert Kohler, St. Germain en Laye; Francois Dawans, Bougival, all of France

[73] Assignee: Institut Francais du Petrole, Rueil-Malmaison, France

[21] Appl. No.: 483,318

[22] Filed: Apr. 8, 1983

[30] Foreign Application Priority Data

Apr. 9, 1982 [FR] France ................. 82 06380

[51] Int. Cl.³ ........................ C09K 3/00; E21B 43/20
[52] U.S. Cl. ............................. 252/8.55 D; 166/275; 166/294
[58] Field of Search ............... 252/8.55 D; 166/275

[56] References Cited

U.S. PATENT DOCUMENTS

| | | | |
|---|---|---|---|
| 3,284,393 | 11/1966 | Vanderhoff et al. | 260/29.6 |
| 3,780,806 | 12/1973 | Bott | 252/8.55 D |
| 3,841,401 | 10/1974 | Restaino et al. | 252/8.55 D |
| 4,024,040 | 5/1977 | Phalangas et al. | 252/8.55 D |
| 4,360,061 | 11/1982 | Canter et al. | 252/8.55 D |
| 4,439,332 | 4/1984 | Frank et al. | 252/8.55 D |

OTHER PUBLICATIONS

Bowcott et al., Zeitschift fur Elektrochemre, vol. 50, No. 4, 1955, pp. 283–290.
Shinoda et al., "Microemulsions: Colloidal Aspects", Advances in Colloid and Interface Science, 4(1975), 281–300.

*Primary Examiner*—Paul Lieberman
*Assistant Examiner*—Robert A. Wax
*Attorney, Agent, or Firm*—Millen & White

[57] ABSTRACT

A transparent and stable microlatex is dispersed into water and the resultant solution is used for treating an oil or gas well to achieve enhanced oil recovery. The microlatex is prepared by polymerization of a water-soluble monomer in a microemulsion of the water-in-oil type.

16 Claims, 3 Drawing Figures

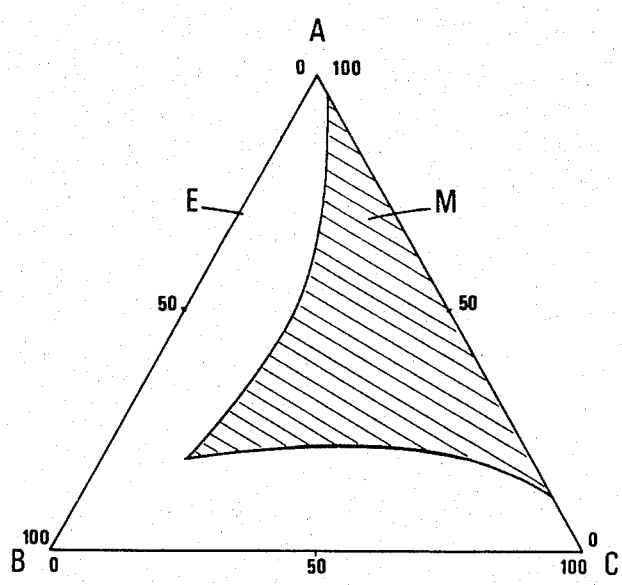

PROCESS FOR MANUFACTURING A MICROLATEX IN A CONTINUOUS OIL PHASE BY POLYMERIZATION OF A WATER-SOLUBLE MONOMER IN A WATER-IN-OIL MICROEMULSION, RESULTANT MICROLATICES, AND THEIR USE FOR ENHANCED OIL RECOVERY

CROSS REFERENCE TO RELATED APPLICATION

This invention is related to concurrently filed application Ser. No. 483,317 by the same inventors and which is directed to the microlatices and process for producing same.

This invention relates to the use of polymer solutions obtained by a particular method in the treatment of oil or gas wells. The treatment may have for an object, for example, enhanced oil recovery or selective plugging for reducing water inflow into production wells.

These aqueous solutions of polymers are obtained by dispersing stable and transparent microlatexes into water, these microlatexes being themselves obtained by polymerizing or co-polymerizing at least one water-soluble vinyl monomer.

In this polymerization process, the water-soluble monomer (or the mixture of the monomers) is dissolved into water and dispersed in a mixture of surfactant and oil, the proportions of the constituents corresponding to the monophasic domains, also called microemulsions, of the surfactant/oil/aqueous monomer solution phase diagram. The monomer is entrapped in the water-swollen micelles whose average radius is, for example, of 4 nanometers. These systems are optically transparent, thermodynamically stable and are thus adapted to photochemical reactions. More precisely, the microlatexes are obtained by a process comprising the following steps:

(a) a stable and transparent microemulsion of the water-in-oil type is prepared by admixing (i) an aqueous phase comprising an aqueous solution of at least one water-soluble vinyl monomer with (ii) an oil phase comprising a hydrocarbon oil and at least one surfactant, in the optional presence of a co-surfactant, the nature and the proportions of the above components being so selected as to satisfy the following two conditions:

(1) the surfactant content of the oil phase is at least 2% by weight, the microemulsion comprises 1-50% by weight of the aqueous phase and 99-50% by weight of the oil phase and the aqueous phase comprises 5-55% by weight of the water-soluble vinyl monomer and 95-45% by weight of water, and (2) the mixture of the two phases constitutes a stable and transparent microemulsion, (b) the microemulsion obtained in step (a) is subjected to polymerization conditions, and (c) the resultant stable and transparent microlatex of high molecular weight is recovered.

FIG. 1 illustrates, by way of example, a surfactant/oil/aqueous monomer solution phase diagram.

In this figure, A corresponds, for example, to 100% of toluene, B to 100% of an aqueous 50% b.w. solution of acrylamide and C to 100% of surfactant: sodium bis-2-ethylhexyl sulfosuccinate (Aerosol OT) of the formula:

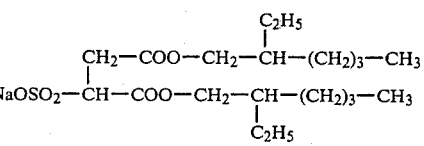

M designates the domain of the transparent (isotropic) microemulsions of the invention and E the domain of the emulsions of reduced transparency and stability, not in conformity with the invention.

The patents FR No. 1 202 929, No. 2 245 671, No. 2 436 792, No. 1 516 426, U.S. Pat. No. 4,022,731 and DE No. 2 925 962 disclose emulsion polymerizations carried out in the domain E, thus not in conformity with the above double condition.

The water-soluble monomer, particularly acrylamide, acrylic acid, N-vinyl pyrrolidone or vinylsulfobetaine, is polymerized in microemulsion by photochemical or thermal way. The method consists of initiating the polymerization photochemically, for example by ultraviolet irradiation, or thermally with a hydrophobic initiator, for example azobisisobutyronitrile, or a hydrophilous initiator, for example potassium persulfate.

The polymerization takes place very quickly, for example, in a few minutes by the photochemical technique way; it is quantitative and leads to the formation of a microlatex whose particle radius is of about 15 nm (more generally <50 nm) with a narrow size distribution range.

The systems remain transparent during the polymerization. Their viscosities are low, for example, of a few centipoises (1 poise=0.1 Pa.s), for example 0.2 to 50 centipoises.

According to a preferred embodiment, the continuous phase consists of a practically pure hydrocarbon phase, due to the selection of a surfactant forming microemulsions without addition of a co-surfactant (alcohol or amine). In that case, the resultant latexes may be diluted to the desired concentration without difficulty.

The operation can also be conducted with a co-surfactant, for example an alcohol or an amine, although this is less desirable. The molecular weight of the resultant polymer is however usually not so high, in that case, and the poly-dispersity is wider, which is sometimes less advantageous for the expected uses.

The molecular weights of the resultant polymers are usually higher than 500 000, generally above 1 000 000, for example of the order of a few millions. This order of magnitude and the low size of the particles suggest that the number of polymer molecules within a particle is very low, possibly as low as 1. The conformation of macromolecules of large size entrapped in a so reduced space presents interesting and original properties.

The same method, when applied, for example, to the radical copolymerization of acrylamide with methylene-bis-acrylamide, leads to the formation of low size microgels (about 30 nm of diameter) dispersed in an oily phase.

An alkaline reactant can be used, for example sodium or potassium hydroxide or carbonate. There is thus obtained, by correctly selecting the proportion of alkaline agent, a partially hydrolyzed polymer, for example a partially hydrolyzed polyacrylamide, which is particularly advantageous for enhanced oil recovery. Another technique consists, however, of effecting the hydrolysis after polymerization. The hydrolysis rate is, for example, 1 to 67%.

The present method thus distinguishes from the emulsion polymerization which leads to latexes of large size.

The difference between emulsion and micro-emulsion is recalled hereinafter.

Emulsion: a diphasic, turbid, unstable medium. When stirring, particles appear which are dispersed in the water or the oil, depending on the case, and have a wide size distribution range with an average size of the order of 1 micrometer. When polymerized in emulsion, the monomer appears dispersed in the big droplets of the emulsion (diameter: about 1 to 10 $\mu$m) as well as in the small micelles of the emulsifier (diameter of about 5 to 10 nm).

Microemulsion: a swollen, transparent and thermodynamically stable micelle solution which does not need stirring. The droplets are far smaller than in the case of an emulsion, justifying the name of microemulsion. Before polymerization, the monomer is dispersed in the water-swollen micelles of the same size.

To form microemulsions, in the absence of a co-surfactive agent, the surfactant proportion must be fairly high; otherwise only simple emulsions are formed. A concentration higher than 11% by weight, with respect to the hydrocarbon phase, is thus desirable, for example 15 to 40% b.w. of this phase. In the presence of a co-surfactant, the surfactant proportion can be lower and amounts, for example, to at least 2% b.w. of the hydrocarbon phase.

There is used, for example, 5 to 55% b.w. of monomer with 95 to 45% b.w. of water. The monomer-containing aqueous phase amounts, for example, to 1 to 50 parts b.w., the hydrocarbon phase proportion being 99 to 50 parts b.w.

A preferred class of surfactants is the anionic class, comprising the aerosols OT, preferably sodium di-2-ethyl-hexyl sulfosuccinate; other surfactants can be used, provided they are of the water-in-oil type, for example a cationic surfactant such as hexadecylbenzene-dimethyl ammonium bromide. Another example of anionic surfactant is sodium dodecylsulfate. A polyoxyethylene derivative can be used as non-ionic agent.

The co-surfactants are well known in the art and need not be described in greater detail. They are mainly alcohols, for example, propanol, butanol or pentanol.

The operation is conducted at, for example, 40°–70° C. when using a free radical generator. The proportion of the latter is, for example, 0.002 to 0.2% b.w.

The size of the particles dispersed in the initial microemulsion and in the final microlatex has been determined by means of quasi-elastic light diffusion. The light source of the light diffusion apparatus consists of an argon-ion Spectra Physics laser operating at 488 nm. The time correlation function of the diffused intensity is obtained with a digital 72-channels correlator. The correlation data of the intensity have been processed by use of the cumulating method which gives the average decreasing time $<\Gamma^{-1}>$ of the correlation function and the variance V. The latter measures the amplitude of the decreasing times distribution; it is given by:

$$V = (<\Gamma>^2 - <\Gamma^2>)/<\Gamma>^2$$

where $<\Gamma^2>$ is the second moment of the distribution.

With respect to solutions of low polydispersity polymers, the variance is related in first approximation to the polydispersity number Mw/Mn (molecular weight b.w./molecular weight by number) by the relation:

$$Mw/Mn = 1 + 4V$$

The molecular weight of the resultant polyacrylamide has been measured both by light diffusion and by viscosimetry, using in the latter case the following relationship applicable to aqueous solutions:

$$[\eta] = 9.33.10^{-3} <M>_w 0.75 cm3/g$$

The initial microemulsions remain transparent and stable in the course of the polymerization reaction.

The transparency may be determined by turbidimetry (see, for example, Colloid and Polymer Science, Vol. 258 (1980) page 1254). It can be used to characterize the microlatexes obtained according to the invention; this detection method of a transition between a homogeneous macroscopic phase and an emulsion consists of measuring the optical transmission of the sample. As a rule, the % of light transmission by turbidimetry is higher than 50% in the case of the microlatexes of the invention, whereas it is lower than 10% and more usually of 0% in the case of the emulsions produced according to the prior art techniques.

It is higher than 80% and more usually higher than 90% for the starting microemulsions.

Polymerizations have been conducted in microemulsion with variable acrylamide/water ratios up to 1.3. In no case, a phase separation has been observed.

The polymerization is fast and a total conversion to polymer is obtained in less than 30 minutes, as confirmed by weighing the polymer and carrying experiments of nuclear magnetic resonance.

Conversely to the high viscosities of the conventional inverted emulsion, the viscosity of the systems is low, about 7–8 centipoises (1 poise=0.1 Pa.s) and is not substantially affected by ultra-violet irradiation. It has been concluded therefrom that the polymerization takes effectively place within the micelles.

The microlatexes of the invention can be used to improve enhanced oil recovery, either as such or after partial hydrolysis, in the already known manner which has been described for the partially hydrolyzed polyacrylamides. They have advantages with respect to the latter, as a result of the lower size of their particles, their lower degree of polydispersity and their thermodynamic stability. They result in a better scavenging of the oil formations and thus in a more efficient oil recovery.

The methods of use of the microlatexes of the invention, as concerns enhanced recovery do not differ substantially from those described for microemulsions of the water-in-oil type (see, for example, U.S. Pat. No. 3,254,714, No. 3,467,188, No. 3,780,806 or No. 4,034,809) or for similar emulsions comprising a polysaccharide (see, for example, U.S. Pat. No. 3,719,606). These methods can thus be used. The microlatexes are used, for example after dilution into water, at a concentration of 50 to 5,000 ppm, preferably 100 to 2,000 ppm, by weight, of polymer with respect to the resultant aqueous phase. The tests effected in the laboratory have shown the efficiency of the microlatexes of the invention.

As a rule, these methods consist of injecting polymer solutions into a formation, through at least one injection well, circulating them through the formation and recovering the displaced hydrocarbons through at least one production well.

The microlatexes of the invention can also be usefully employed for ground consolidation or as constituents of drilling muds, to prevent water inflow into production wells and as completion or fracturation fluids.

The method used to inhibit water inflow into production wells consists of injecting, from the production well, into the portion of the formation to be treated, an aqueous solution of polymer prepared by dissolution of a microlatex into water; the well can then be put into production: the oil and/or gas pass selectively through the treated zone whereas the passage of water is inhibited.

The following examples illustrate the invention. They must not be considered as limiting in any respect the scope thereof.

EXAMPLE 1

3.5 g of acrylamide are dissolved into 10.4 g of water and the resultant solution is dispersed by stirring into a previously prepared mixture of 68.9 g toluene, 17.2 g sodium bis-2-ethylhexyl sulfosuccinate (Aerosol OT) and $5 \times 10^{-3}$ g of azobisisobutyronitrile.

After degassing with nitrogen, the resultant transparent system is exposed to ultra-violet irradiation for about 30 minutes (5 mn are usually sufficient). Stirring is not necessary, since the microemulsion is stable.

The resultant microlatex has a particle radius of about 160 Å (16 nm), whereas the radius of the droplets of the initial microemulsion was about 38 Å (3.8 nm). This monophasic microlatex is stable and transparent. The polydispersity number of the polymerized system is low, the variance being about 0.05 (the variance of the unpolymerized system was about 0.02).

The following Table shows the evolution of the light transmission (% T), determined by turbidimetry, and the evolution of the microlatex viscosity ($\eta$ in centipoises) during the polymerization:

| BEFORE POLYMERIZATION | | AFTER POLYMERIZATION | |
| --- | --- | --- | --- |
| % T | $\eta$ cps | % T | $\eta$ cps |
| 95 | 3.1 | 70 | 1.5 |

1 poise = 0.1 Pa ·s

The resultant polymer has been precipitated by an excess of acetone for characterization thereof. The molecular weight, determined by viscosimetry or by light diffusion is about $3.10^6$.

COMPARISON EXAMPLE

Figure 2B:
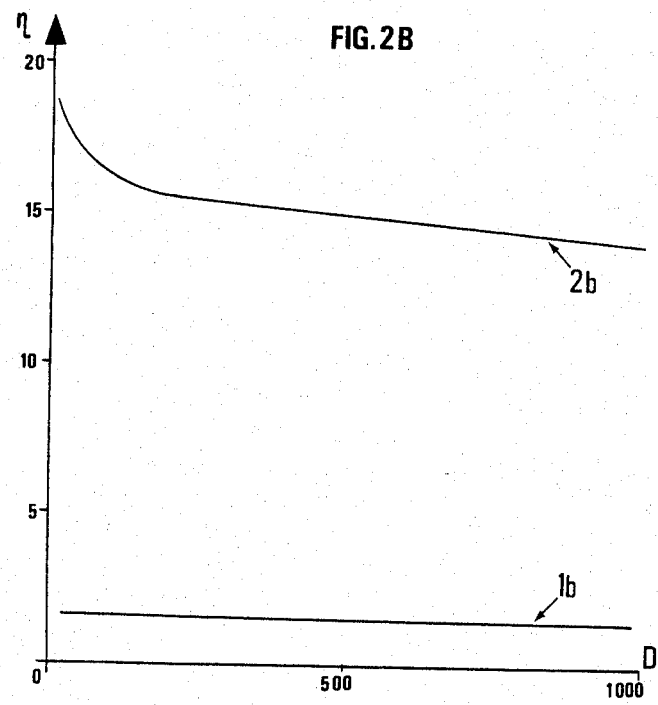

Example 1 is repeated with the use of a composition corresponding to the domain E of the simple emulsions in the toluene—Aerosol OT—water+acrylamide phase diagram of FIG. 1: 7 g of acrylamide are dissolved into 32.94 g of water and this solution is dispersed into a mixture containing 43 g of toluene, 16.97 g of Aerosol OT and $7 \times 10^{-3}$ g of azobisisobutyronitrile. The resultant mixture is opaque and separates into two phases when left unstirred. It does not constitute a microemulsion. The curve (2a) of FIG. 2A, shows the viscosity $\eta$ (centipoises) at different shear rates D ($sec^{-1}$) with a coaxial cylinders rheometer, the emulsion is non-newtonian before polymerization, in contrast with the microlatex of the invention (curve 1a, corresponding to the microlatex of example 1); the same is true after polymerization (see FIG. 2B: the curve 2b corresponds to the latex of the comparison example and curve 1b to the microlatex of example 1). In addition, the mixture, after polymerization, is unstable and turbid, the light transmission coefficient (% T) being zero. The molecular weight ($\overline{M}_\nu$) of the polymer isolated by precipitation as in example 1 and determined by viscosimetry is $1.10^6$; it is thus far lower than that of the microlatex of the invention.

EXAMPLE 2

2.9 g of acrylamide are dissolved into 10.8 g of water and the solution is dispersed in a mixture of 43.6 g toluene, 42.7 g aerosol OT and 0.29 g azobisisobutyronitrile. The transparent and stable system is degassed and maintained at 60° C. for 10 minutes. The % of transmission by turbidimetry decreases from 96% for the initial microemulsion to 55% for the final microlatex which is stable and transparent.

The molecular weight of the resultant polyacrylamide, determined by viscosimetry, is $8.10^5$.

EXAMPLE 3

3.58 g of acrylamide are dissolved into 3.37 g of water; the solution is dispersed by stirring into a previously prepared mixture of 59.36 g normal heptane, 33.69 g sodium bis-ethyl-hexyl sulfosuccinate (aerosol OT) and $3.5 \times 10^{-3}$ g of phenyl dimethoxymethylphenylketone (IRGACURE 651 of Ciba Geigy). The stable and transparent mixture is irradiated with ultra-violet light at 20° C. The conversion to polyacrylamide is quantitative and the particle radius of the resultant transparent microlatex is about 10 nm, whereas the radius of the droplets of the initial microemulsion was about 7 nm. The % of transmission by turbidimetry is 96% for the initial microemulsion and 63% for the final microlatex which is stable and transparent.

EXAMPLE 4

6.87 g of acrylamide are dissolved into 7.65 g of water; the solution is dispersed by stirring into a mixture of 68.43 g of toluene, 17.04 g of Aerosol OT and $6.5 \times 10^{-4}$ g of azobisisobutyronitrile. The transparent and stable mixture is heated to 45° C.; after 20 minutes, the conversion to polymer is higher than 97% and the molecular weight of the resultant polymer is $6.3 \times 10^6$.

The evolution of the particle size, the viscosity and the transparency of the microlatex is as follows:

| BEFORE POLYMERIZATION | | | AFTER POLYMERIZATION | | |
| --- | --- | --- | --- | --- | --- |
| PARTICLE RADIUS (Å) | T (%) | $\eta$ (cps) | PARTICLE RADIUS (Å) | T (%) | $\eta$ (cps) |
| 60 | 94 | 5.5 | 230 | 70 | 1.6 |

EXAMPLE 5

7.16 g of acrylamide are dissolved into 7.15 g of water and this solution is dispersed into a mixture of 68.53 g of toluene, 17.16 g of aerosol OT and 0.71 g of azobisisobutyronitrile. The transparent and stable system is degassed and maintained at 60° C. for 10 minutes. A stable and transparent microlatex is obtained.

The molecular weight of the resultant polyacrylamide is $5 \times 10^6$.

EXAMPLE 6

4.76 g of acrylamide are dissolved into 4.70 g of water and the solution is dispersed into a mixture of 166.72 g of toluene, 15.86 g of butanol, 7.92 g of sodium dodecylsulfate and 0.03 g of benzoine ethyl ether. The transparent system is degassed, put in nitrogen atmosphere and irradiated with ultra-violet light at 20° C. for 12 minutes. The conversion to polyacrylamide is quantitative and the transparency and the viscosity of the microlatex do not change substantially during the polymerization.

EXAMPLE 7

7.8 g of vinylpyrrolidone are dissolved into 7.8 g of water and the solution is dispersed into a mixture of 70.37 g of n-heptane, 17.89 g of Aerosol OT and 0.06 g of benzoine ethyl ether $C_6H_5CH(OC_2H_5)COC_6H_5$. The resultant transparent mixture is irradiated with ultra-violet light. The conversion to transparent polyvinylpyrrolidone microlatex is 90%.

EXAMPLE 8

4.49 g of (3-sulfopropyl)-2-vinylpyridinium betaine

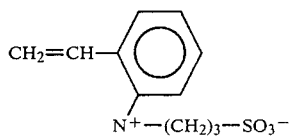

are dissolved into 5.36 g of water and the solution is dispersed into a mixture of 71.82 g of toluene, 18.24 g of Aerosol OT and 0.05 g of potassium persulfate $K_2S_2O_8$. The solution remains transparent and fluid when heated at 50° C. for 16 hours. A transparent microlatex of high molecular weight is obtained. The polymer is isolated as a very fine powder by precipitation of the mixture in an excess of methanol.

EXAMPLE 9

42 g of a 50% b.w. solution of acrylamide in water is added to 51.6 g of sodium dioctyl sulfosuccinate dissolved in 206 g of toluene. The inverse transparent microemulsion thus obtained is degassed and irradiated with an UV lamp for 15 minutes. A transparent microlatex is obtained by precipitation of a portion of the resultant microlatex in acetone, successive washings with acetone and methanol and drying up to constant weight. A polyacrylamide having a molecular weight of $10.3 \times 10^6$ (by viscosimetry) is obtained with a conversion of 95%.

Another portion of the microlatex (150 g) is admixed with 2.49 g of potassium hydroxide as a solution in 11.4 g of water. The reaction mixture is heated for 2 hours at 65° C. and then for 2 hours at 90° C. The polymer obtained after washing with acetone and methanol and drying has a hydrolysis degree of about 30%, as determined by potentiometric determination. The intrinsic viscosity ($\eta$) of this copolymer dissolved in water containing 0.1M of NaCl is 4,800 cm$^3$/g, as determined with a LS 30 viscosimeter of the Contraves Company and extrapolation at zero concentration and gradient. A solution of this copolymer (concentration: 1000 ppm b.w.) has then be prepared by dispersing the microlatex into water from a field containing about 30 g/l of dissolved salts, including 8.6 g/l of Na$^+$ ions, 1.3 g/l of Ca$^{++}$ ions and 0.3 g/l of Mg$^{++}$ ions. This solution has then been subjected to a conventional filtration test, as follows:

1. the solution is passed through a series of 8 $\mu$m Millipore filters of a pore radius $r_p$ adapted to the permeability of the rock samples from the field to be treated $$(r_p = \sqrt{\frac{8k}{\phi}}$$

where k is the permeability and $\phi$ the porosity). The injection is effected at a constant rate of $V_{inj.} = 0.25$ meter per day with a double-acting pump and at a temperature of 45° C. The pressure drop in mm Hg is measured at the ends of the filter carrier which contains three 8 $\mu$m Millipore filters in series and the results are expressed as the mobility reduction $R_\lambda$. The latter is defined as the ratio of the pressure drop measured when passing the polymer solution to the pressure drop measured with the field water.

2. the relative viscosities of the polymer solution are measured before and after passage through the filters.

3. the polymer solution is circulated through the same filters at different velocities and the curve $R_\lambda = f (V_{inj.})$ is determined.

4. field water is circulated behind the polymer solution at different circulation velocities and the curve $R_k = f (V_{inj.})$ is determined, $R_k$ being the permeability reduction observed with the field water.

Table 1 summarizes the results obtained, showing the good quality of the polymer solution and particularly the absence of plugging.

TABLE 1

| Test of filtrability through 8 $\mu$m Millipore filters in series. | | | |
|---|---|---|---|
| CIRCULATION RATE in m/day | $R_\lambda$ | $R_k$ | $\eta$ rel |
| 0.5 | 4.7 | 1.35 | 4.70 |
| 1 | 4.7 | 1.35 | 4.68 |
| 2 | 4.7 | 1.47 | 4.62 |
| 5 | 5.85 | 1.82 | 4.35 |
| 10 | 8.1 | 2.15 | 4.05 |

It is also found that the relative viscosity of the polymer solution before and after passage through the filters remains unchanged ($\eta$rel = 3.13), which confirms the absence of any filter plugging.

The same microlatex is used to prepare a solution in the same field water (30 g/l of dissolved salts) containing 2000 ppm of polymer. This solution is then injected into a core from the field (L = 10 cm, d = 2.5 cm, k = 490 mD) (k is the permeability with respect to water, expressed as milli-Darcy) at a rate of 0.4 m/day and the pressure drops at the ends of the core are determined as above. The values of $R_\lambda$ are determined with the polymer solution and those of $R_k$ with water circulated behind the polymer at different circulation rates.

On the other hand, the Contraves LS 30 viscosimeter is used to determine the values of the relative viscosity $\eta$rel at different velocity gradients.

The results of Table 2 show the capacity of the microlatex to circulate through the porous medium; particularly, an apparent viscosity in porous medium higher than 10 is obtained, thus allowing the use of this polymer as mobility buffer behind the previously injected surfactant solution. No plugging of the input surface of the core is observed.

TABLE 2

| Filtrability test through a field core. | | | |
|---|---|---|---|
| CIRCULATION RATE in m/day | $R_\lambda$ | $R_k$ | $\eta$ rel LS 30 |
| 0.4 | 13.8 | 1.5 | 12.3 |
| 0.8 | 13.9 | 1.5 | 11.8 |
| 2 | 13.9 | 1.55 | 10.3 |
| 4 | 15.1 | 1.6 | 9.3 |
| 8 | 27 | 1.75 | 7.8 |

Inhibition of Water Inflow Into Production Wells

A porous medium (L=10 cm, cross-section=20 cm$^2$) consisting of the mixture of 84% coarse sand (particle size: 200 to 300μ), 8% calibrated silica (particle size: 15 to 80μ), 4% montmorillonite and 4% kaolinite and having a water permeability of about 1 darcy is saturated with brine containing 20 g/l of NaCl at 30° C. The acrylamide-acrylate copolymer prepared from the corresponding microlatex and dispersed at a rate of 1600 mg/l in water containing 20 g/l of NaCl is injected into this porous medium. This solution has a viscosity of 7.9 cps. An amount thereof representing about 10 times the pore volume is injected to completely saturate the core and the polymer solution is then displaced with water containing 20 g/l of NaCl up to stabilization of the pressure drops at the ends of the core. The ratio of the water permeabilities after and before injection of the polymer solution is 7.

The same experiment is repeated with an identical porous medium, but with a solution containing 3000 ppm of copolymer; the permeability reduction is 12.3.

These experiments show that the copolymer can be easily injected in a clayish sand of average permeability and can be used to reduce water inflow into production wells.

EXAMPLE 10

25 g of an aqueous solution containing 2 g potassium carbonate and 7 g acrylamide is added to 30 g of sodium dioctyl-sulfosuccinate dissolved in 115 g of toluene containing 10 mg of AIBN. The transparent and stable mixture is degassed and irradiated with an UV lamp for 1 hour. The mixture is then heated for 2 hours at 65° C. A transparent microlatex of high molecular weight is obtained. A fraction of the polymer is isolated by precipitation into acetone, washed several times with acetone and methanol and finally dried up to constant weight. The so-obtained polyacrylamide has a hydrolysis rate of about 20%.

What is claimed is:

1. A process for the treatment of an oil or gas well, wherein an aqueous solution of polymer is injected from the well into the surrounding formation, characterized by the injection of a solution obtained by dispersion into water of a stable and transparent microlatex itself obtained by the following steps:
(a) a stable and transparent microemulsion of the water-in-oil type is prepared by admixing (i) an aqueous phase comprising an aqueous solution of at least one water-soluble vinyl monomer selected from the group consisting of (3-sulfopropyl)-2-vinyl pyridinium betaine, acrylamide and acrylic acid with (ii) an oil phase comprising a hydrocarbon oil with at least one surfactant, in the optional presence of a co-surfactant, the nature and the proportions of the above components being so selected as to satisfy the following two conditions:
(α) the surfactant content of the oil phase is at least 2% by weight, the microemulsion comprises 1-50% by weight of the aqueous phase and 99-50% by weight of the oil phase with respect to the total weight of said aqueous phase and said oil phase and the aqueous phase comprises 5-55% by weight of the water-soluble vinyl monomer and 95-45% by weight of water, and
(β) the mixture of the two phases constitutes a stable and transparent microemulsion,
(b) the microemulsion obtained in step (a) is subjected to polymerization conditions, to form a stable and transparent microlatex of polymer or copolymer with a molecular weight of at least 500,000, and
(c) the resultant stable and transparent microlatex is recovered.

2. A process according to clam 1, wherein no co-surfactant is present and the surfactant content of the oil phase is at least 11% by weight.

3. A process according to claim 1, wherein the surfactant concentration is from 15 to 40% b.w. in the oil phase.

4. A process according to claim 1, wherein the water-soluble vinyl monomer is acrylamide.

5. A process according to claim 1, wherein the water-soluble vinyl monomer is acrylic acid.

6. A process according to claim 1, wherein the water-soluble vinyl monomer comprises a mixture of acrylamide and acrylic acid.

7. A process according to claim 1, wherein the water-soluble vinyl monomer is acrylamide and the steps (a) and (b) are effected in the presence of an alkaline agent able to partially hydrolyze the resultant polyacrylamide.

8. A process according to claim 1, wherein the resultant microlatex is subjected to partial hydrolysis before use in enhanced oil recovery.

9. A process according to claim 1, wherein a co-surfactant selected from the alcohols and amines is also present.

10. A process according to claim 1, wherein the polymer content of the aqueous solution injected from the well is from 50 to 5000 ppm by weight.

11. A process according to claim 1, wherein the surfactant is of the anionic type.

12. A process according to claim 11, wherein the surfactant is sodium di-2-ethylhexylsulfosuccinate.

13. A process according to claim 1, applied to enhanced oil recovery.

14. A process according to claim 1, applied to the inhibition of water inflow into an oil or gas producing well.

15. A process according to claim 1 wherein the polymer has a molecular weight of at least 1,000,000.

16. A process according to claim 1 wherein the water-soluble vinyl monomer is (3-sulfopropyl)-2-vinyl pyridinium betaine.

* * * * *